May 29, 1956
H. T. BACKHOUSE
2,747,870
SHEET CONVEYOR
Filed Feb. 26, 1952
3 Sheets-Sheet 1
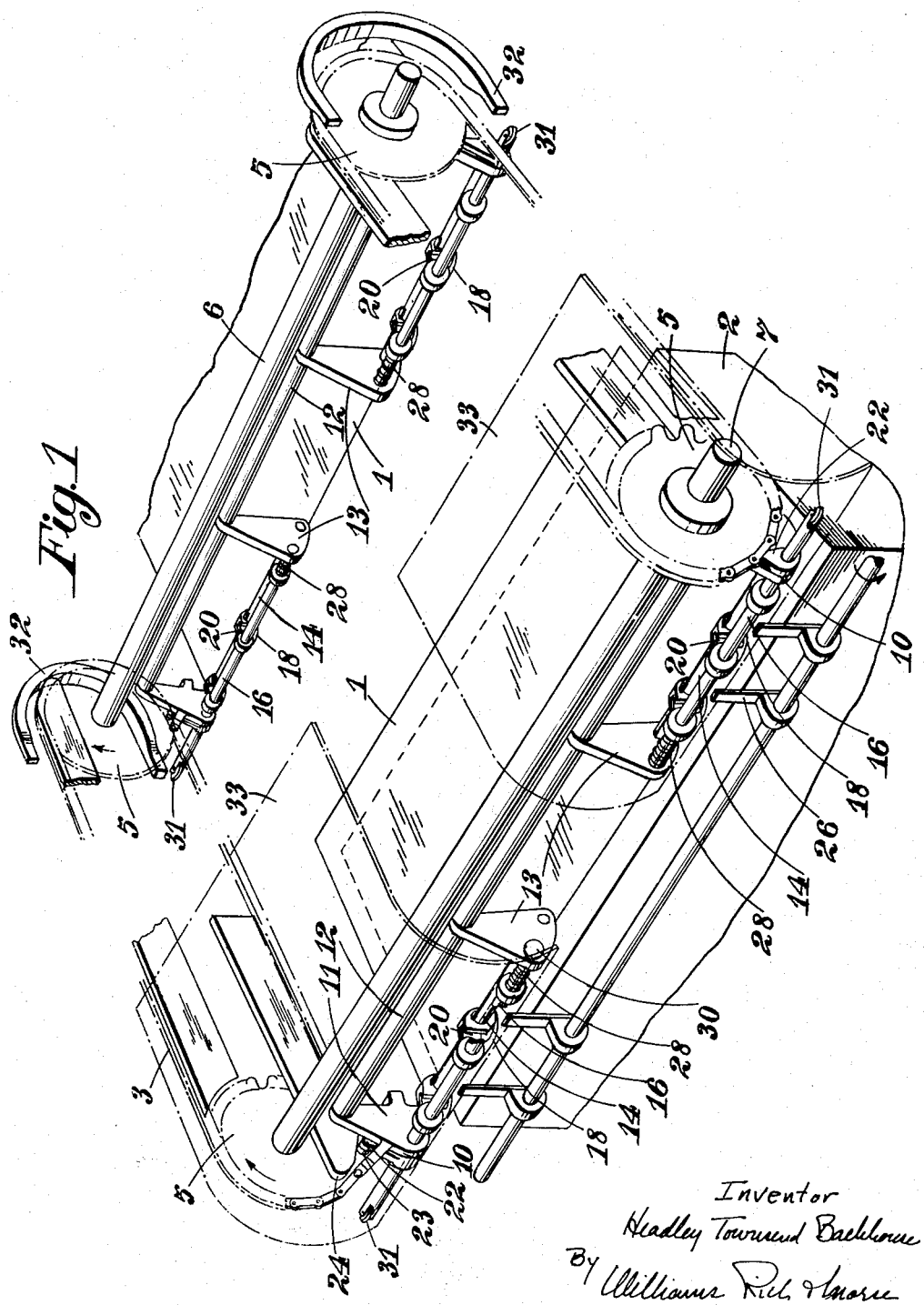

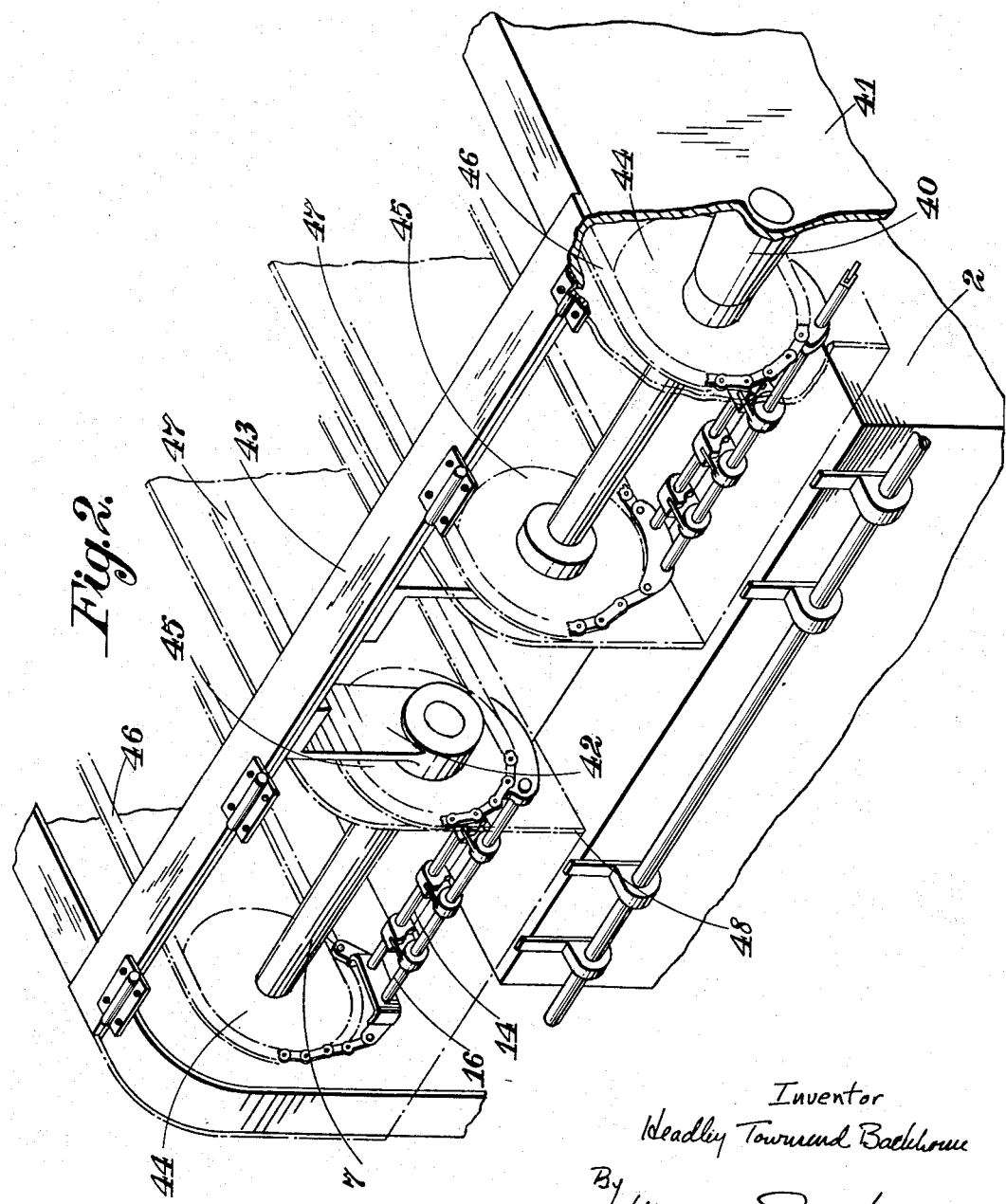

May 29, 1956 H. T. BACKHOUSE 2,747,870
SHEET CONVEYOR
Filed Feb. 26, 1952 3 Sheets-Sheet 3
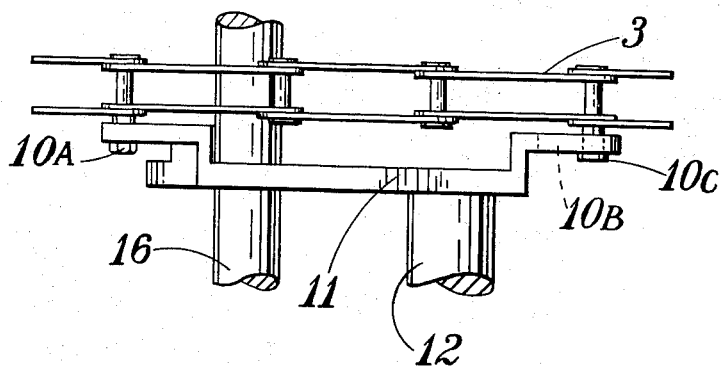
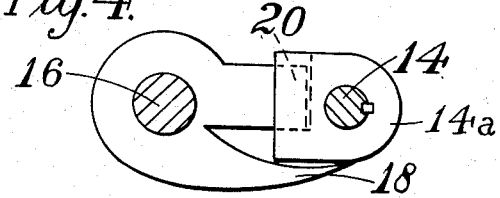
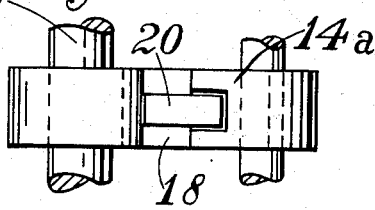
Inventor
Headley Townsend Backhouse
By
Churchill, Rich, Weymouth, & Engel
Attorneys United States Patent Office 2,747,870
Patented May 29, 1956

2,747,870

SHEET CONVEYOR

Headley Townsend Backhouse, Nassau, Bahamas, British West Indies

Application February 26, 1952, Serial No. 273,494

Claims priority, application Great Britain February 28, 1951

7 Claims. (Cl. 271—79)

The invention relates to conveyors for sheets of paper, card, metal or the like, more particularly (but not exclusively) for conveying to a stacking station sheets received from a printing or other machine operating on individual sheets. The invention is concerned with conveyors of the kind comprising two endless chains or the equivalent; pulleys, sprocket wheels or the equivalent for supporting the chains or equivalent to travel in unison and opposed relation in two spaced parallel planes; and sheet grippers carried by the chains for movement therewith in a closed circuit between sheet receiving and sheet delivery stations, there being at least two grippers spaced apart along a line perpendicular to the said planes, and operating means to cause the grippers to take hold of the front edge of a sheet at the receiving station and to hold the sheet while travelling to the delivery station and there to release the sheet.

In conveyors of the above kind as at present constructed there are grippers positioned at short intervals along the line across the space between the chains, and the grippers are carried by a bar which is attached at its ends to the chains and extends across the space in or adjacent to the line of the grippers. Usually the bar is on a line which intersects or is adjacent to the tracks of the chains. In use the bar, as it travels with the chains, sweeps over the whole width of the receiving and delivery stations rendering it both difficult and dangerous to examine closely and/or to manipulate by hand, the sheets at either of these stations or in their passage along the conveyor. It is an object of the present invention to provide an improved conveyor of the above kind in which this difficulty is substantially reduced.

With the above object in view the invention provides a conveyor of the kind above described in which grippers are provided only at the side portions of the space between the chains or outside the chains and are carried by a gripper bar which is discontinued at the middle portion so as to form in effect two separate bars, suitable supporting means for the two bars being provided, for example a crank connecting the two bars which travels a substantial distance inwardly of the paths of the grippers. The omission of grippers and of the gripper bar from the middle portion substantially facilitates access to the central portion of the sheets particularly at the ends of the conveyor.

When a crank connecting the gripper bars is employed it is preferred that the crank travel along a path which is closely adjacent to the plane containing the centre lines of the paths of the chains.

Alternatively each of the two gripper bars may be carried on and supported by a pair of endless chains so that there are two chains at each side of the conveyor, with the bars extending between the chains of each pair respectively.

In one construction of conveyors of the above kind, the grippers comprise gripper fingers which are carried by the gripper bar, and anvils carried on an anvil bar, the fingers gripping the sheet against the anvils and the anvil bar, like the gripper bar, being carried by the chains and extending across the space between the chains. In such a construction, the anvil bar also causes difficulty in the close inspection and manipulation of the sheets. When, as is preferred, such an anvil bar is provided in the conveyor according to the present invention, the bar may be discontinued and supported like the gripper bar.

It is preferred that means are provided to move the grippers relatively outwardly away from one another (i. e. towards the side chains) after they have engaged a sheet for the purpose of stretching the sheet and thereby preventing or reducing sag of the sheet at the centre portion which is without support from grippers.

For the purpose of effecting the outward movements of the grippers, the gripper bars, which carry the grippers or gripper fingers at the two sides of the machine respectively, may be arranged for outward movement carrying the grippers or one of the bars carrying the grippers at one side of the conveyor may be so arranged. Preferably the outward movement is effected by spring means and the return, inward movement, after the sheet has been released, is effected by cam means, for example, cams engaging the ends of the bars. When anvils carried on an anvil bar as above described are employed the anvils may be arranged for outward movement with the gripper fingers and may be arranged to slide on the anvil bar for that purpose.

As examples of the invention a specific construction of chain conveyor and a modification thereof will now be described with reference to the drawings in which:

Figure 1 is a perspective view, partly diagrammatic of the conveyor,

Figure 2 is a perspective view of the delivery end of the modified conveyor,

Figure 3 is a detail plan view showing the attachment of a chain plate to a chain, Figure 4 is a side view of a gripper, and Figure 5 is a plan view of a gripper.

The conveyor forming the subject of this example and shown in Figure 1 is intended for use in conveying sheets 1 delivered from a printing machine to a stacking station at which the sheets are delivered on to the top of a pile 2. The conveyor comprises two endless roller chains 3 which pass over sprocket wheels at the receiving and delivery ends of the conveyor, the delivery sprockets being shown at 5. The chains are spaced apart by a distance somewhat greater than the maximum width of the sheets to be conveyed, and travel in vertical planes. The sprocket wheels 5 are carried on two shafts 6 and 7 at the receiving and delivery ends respectively. The shafts 6 and 7 extend across the space between the chains 3 and one constitutes a driving shaft for the chains.

The chains 3 carry two or more sets of grippers at intervals along the length thereof. The several sets are of like construction and for simplicity the following description relates only to one set.

Secured to the chains 3 at corresponding opposed positions there are two chain plates 10, one to each of the two chains 3. As shown in Fig. 3, each chain plate 10 is secured, in a manner known per se, to the chain by a bolt 10A replacing one of the chain rivets and by a fork 10B fitting over a pin 10C on the chain to constrain the plate 10 to move with the chain and to maintain a constant attitude relative to the link to which it is secured. Each chain plate 10 has an inwardly directed chain plate arm 11. A tie bar 12 is attached to the ends of the arms 11 and extends across the space between the chains 3, the bar 12 being positioned adjacent the centre lines of the tracks of the chains 3 so that when at the ends of the tracks the chain plates 10 pass around the sprocket wheels the bar 12 passes around and closely adjacent to the shafts 6 and 7 carrying the sprocket wheels 5. At about a third of its length from each end the tie bar 12 carries a support plate 13 which extends outwardly, and each support plate 13 is also connected to the adjacent chain plate 11 by a rod 14 secured to the two plates and parallel to the tie bar 12. These rods 14 carry anvils 14a and constitute anvil bars as described above. The chain plates 11, the support plates 13, the tie bar 12 and the anvil bars 14 constitute a rigid structure extending between the chains 3 with the anvil bars 14 positioned on a transverse line just outside the chains. The portion of tie bar 12 between the support plates 13 and the said support plates constitute the "crank" portion of the bar supporting structure referred to above.

Supported for rotational and sliding movement in the chain plates 11 and the support plates 13 there are two gripper bars 16, one at each side of the conveyor. These bars 16 which are in alignment and are parallel to the tie bar 12 and anvil bars 14 leave the space between the support plates 13 clear of obstruction.

In this example each gripper bar 16 carries three gripper fingers 18 in the form of arms which are rearwardly directed in relation to the direction of movement of the chains 3. These arms 18 co-operate with corresponding anvil blocks 14a mounted on the anvil bars 14 for sliding movement but constrained against rotation. As shown in Fig. 5, the anvil blocks 14a are forked and tongues 20 on the gripper arms are received within these forks to constrain the arms and blocks for simultaneous sliding movement.

Each gripper bar 16 carries a radial arm 22 which is outside the chain plate 10, 11 and has at its free end a roller 23 which co-operates with a fixed cam plate 24 in known manner. The arrangement is such that at the receiving end of the conveyor the cam 24 by its engagement with the follower 23 rocks the gripper bar 16 first to separate the gripper fingers 18 from the anvils 14a ready for reception of a sheet and then to allow the grippers 18 to close to hold the sheet against the anvils 14a under spring pressure. At the delivery end of the conveyor the cam plate 24 rocks the gripper bar 16 to open the grippers by separation of the fingers 18 from the anvils 14a and thereby to release the sheet 1 which falls on to the pile 2 and is positioned by front stacking gauges 26.

Each gripper bar 16 is urged outwards (i. e. away from the other bar) by a spring 28 (which also provides the spring pressure aforesaid) surrounding the bar 16 and between its support plate 13 and the adjacent gripper finger 18. A head 30 on the end of the bar 16 limits the outward movement by engagement with the support plate 13. Each bar 16 carries at its outer end a roller 31 which co-operates with a cam track 32 at the side of the conveyor. The cam tracks 32 are at the receiving end and are so shaped and positioned that at the receiving end of the conveyor the gripper bars 16 are pushed inwardly against the spring 28 before the sheet 1 is gripped. Immediately after the sheet 1 has been gripped the cams 32 permit the bars 16 to move outwardly under the action of their springs 28. This has the effect of tautening the front edge of the sheet 1 and thereby of preventing sagging of the sheet, and the outward movement of the bars 16 is limited by the sheet until the sheet is released at the delivery end of the conveyor when the bars 16 move outwardly to the limits determined by the engagement of their heads 30 with the support plates 13. It will be appreciated that the inward and outward movements of the bars 16 and of their grippers 18 are accompanied by corresponding movements of the anvils 14a.

Cover plates 33 are provided over the chains, sprocket wheels and gripper mechanisms at the two sides of the conveyor at the delivery station. These cover plates 33 leave open the space between the support plates 13 and the only obstruction to the space is the support shaft 7 for the sprocket wheels and the central portion of the tie bar 12 which, as already stated, travels round the shaft closely adjacent thereto.

In a modified form of the above example shown in Figure 2 the gripper bar 16, the anvil bar 14 and the support shafts 7 for the sprocket wheels are all constructed in two parts with a gap between the parts to leave the centre of the conveyor free from obstruction. Each part of each of the support shafts 7 is carried at one end in a bearing 40 in the side frame 41 of the machine and at its other end by a support bracket 42 dependent from a cross-bar 43 above the machine. Each part of the shaft 7 carries near its ends two sprocket wheels 44, 45 for two parallel chains 46, 47 so that there are two pairs of chains, one pair 46, 47 for each side of the conveyor. The two parts of the gripper bars 16 and anvil bars 14 are carried by these two pairs of chairs 46, 47 respectively and each part has associated with it cam means (as shown in Figure 1) for opening the grippers and for effecting inward movement of the grippers and anvils as described above. Transparent cover plates 48 are hinged to the cross-bar 43 and fit over the sprocket wheels and chains leaving the centre part open.

It will be appreciated that the conveyor forming the subject of the above example will operate on sheets having a minimum width equal to the spacing between the inner pair of grippers and that the maximum width of the sheets is determined by the space between the outer chains 46. It is however within the invention to position the grippers or some of them, outside the chains, and the construction shown in Figure 2 may be regarded as such an arrangement, the inner pair of chains then being considered an equivalent to the chains 3.

I claim:

1. A sheet conveyor of the kind comprising two endless chains, sprocket wheels for supporting the chains to travel in unison in opposed relation in two spaced parallel vertical planes, at least two rearwardly facing sheet-grippers spaced apart along a line perpendicular to the two planes, means for attachment of the grippers to the chains for movement therewith between sheet receiving and sheet delivery stations, and operating means to cause the grippers to take hold of the leading edge of a sheet at the receiving station and to hold the sheet while travelling to the delivery station and there to release the sheet, there being a substantial central portion of the space between the chains without grippers, which conveyor is characterised by the features that the attachment means for the grippers comprise bars carrying the two grippers at opposite sides of the said central portion of the space extending perpendicular to the said planes of the chains, each bar being attached at one end to one of the two chains, and that there are means supporting the other ends of the bars and bridging the said central portion of the space, whereby access to the central portion of a sheet held by the grippers is provided.

2. A sheet conveyor as claimed in claim 1, in which the support means for the inner ends of the bars comprise a crank offset from the line of the grippers connecting the opposed bars and lying a substantial distance inwardly of the paths of the chains.

3. A sheet conveyor as claimed in claim 1, in which the support means for the inner ends of the bars comprise a further pair of endless chains so that there are two chains at each side of the conveyor with the bars extending between the two chains at the two sides respectively, the grippers being outside the compass of the paths of the inner chains.

4. A sheet conveyor as claimed in claim 1, and including means for moving the grippers relatively outwardly away from one another and relatively to the supporting chains after the grippers have engaged a sheet and for effecting return inward movement of the grippers after they have released the sheet.

5. A sheet conveyor as claimed in claim 1, in which the gripper-carrying bar on one side of the machine is arranged for outward movement away from the gripper-carrying bar at the other side of the machine.

6. A sheet conveyor as claimed in claim 5, in which the means for moving the gripper-carrying bar outwardly comprise a spring and there is a cam arranged to engage the outer end of the bar for effecting return movement thereof.

7. A sheet conveyor as claimed in claim 5, in which at least one of the grippers comprises a finger carried on a bar as aforesaid and an anvil carried for sliding movement on an anvil bar fixed against outward movement and in which the finger and anvil have interfitting engagement to cause the anvil to move along the anvil bar with outward movement of the finger.

References Cited in the file of this patent
UNITED STATES PATENTS

| | | |
|---|---|---|
| 1,050,857 | Sheldon | Jan. 21, 1913 |
| 1,329,936 | Spiess | Feb. 3, 1920 |
| 1,641,437 | Jones | Sept. 6, 1927 |
| 1,971,896 | Barber | Aug. 28, 1934 |
| 1,999,587 | Davis | Apr. 30, 1935 |
| 2,631,038 | Wood et al. | Mar. 10, 1953 |